United States Patent
McCloskey et al.

(10) Patent No.: US 8,924,682 B1
(45) Date of Patent: Dec. 30, 2014

(54) METHOD OF PROTECTING VIRTUAL TAPE DATA FROM ACCIDENTAL LOSS DUE TO OVERWRITING

(75) Inventors: Larry W. McCloskey, Burlington, MA (US); Thomas McCafferty, Peabody, MA (US)

(73) Assignee: EMC Corporation, Hopkinton, MA (US)

(*) Notice: Subject to any disclaimer, the term of this patent is extended or adjusted under 35 U.S.C. 154(b) by 175 days.

(21) Appl. No.: 13/444,562

(22) Filed: Apr. 11, 2012

Related U.S. Application Data

(63) Continuation of application No. 13/340,280, filed on Dec. 29, 2011, now abandoned.

(51) Int. Cl.
*G06F 12/00* (2006.01)
(52) U.S. Cl.
USPC .......................................................... 711/171

(58) Field of Classification Search
USPC .......................................... 711/171, 163, 170
See application file for complete search history.

(56) References Cited

U.S. PATENT DOCUMENTS

| | | | |
|---|---|---|---|
| 8,291,183 B2 | 10/2012 | McCloskey et al. | |
| 2005/0131955 A1* | 6/2005 | Borthakur et al. | 707/200 |
| 2005/0235103 A1* | 10/2005 | Saliba et al. | 711/111 |
| 2009/0319772 A1* | 12/2009 | Singh et al. | 713/153 |
| 2010/0165503 A1* | 7/2010 | Choi et al. | 360/75 |

\* cited by examiner

*Primary Examiner* — Aimee Li
*Assistant Examiner* — Christopher Do
(74) *Attorney, Agent, or Firm* — Hamilton, Brook, Smith & Reynolds, P.C.

(57) ABSTRACT

In one embodiment, a system includes a main data system, a virtual tape volume coupled to receive a write request from the main data system, and an accidental loss protection system configured to receive the write request to the virtual tape volume, detect whether the write request overwrites a label of the virtual tape volume, and prevent the overwriting of the label.

12 Claims, 5 Drawing Sheets

METHOD OF PROTECTING VIRTUAL TAPE DATA FROM ACCIDENTAL LOSS DUE TO OVERWRITING

RELATED APPLICATION

This application is a continuation of U.S. application Ser. No. 13/340,280, filed Dec. 29, 2011 now abandoned.

The entire teachings of the above application are incorporated herein by reference.

BACKGROUND

In a system with virtual tape volumes coupled to a mainframe, errant commands from the mainframe can overwrite volume labels in the virtual tape volumes. Overwriting a volume label accidentally can cause significant data loss, such as losing all data on the virtual tape volume. This can occur in several ways, but one common way is when the mainframe software repositions the virtual tape volume to the beginning of the volume. Starting to write data from this point can overwrite the label or labels written at the beginning of the volume. With the labels now overwritten, all of the data on the virtual tape volume may not be recovered properly. Further, changing mainframes and mainframe software to stop the errant commands from being issued in the first place is difficult and costly because of the many varieties of mainframes and mainframe software that would have to be redesigned.

SUMMARY

In one embodiment, a system includes a main data system, a virtual tape volume coupled to receive a write request from the main data system, and an accidental loss protection system configured to receive the write request to the virtual tape volume, detect whether the write request overwrites a label of the virtual tape volume, and prevent the overwriting of the label.

The accidental loss protection system may be configured to detect whether the write request overwrites the label of the virtual tape volume with user data by determining whether (i) at least one previous write request wrote user data to the virtual tape volume, (ii) the write request jumped or rewound to the beginning of the virtual tape volume, (iii) the virtual tape volume has a label, and (iv) determining whether content of the write request is user data and not a label. If the determinations of all of (i), (ii), (iii), and (iv) are positive, then the accidental loss protection system may prevent the overwriting of the label. If the determinations of at least one of (i), (ii), and (iii), (iv) are negative, then the write request may be executed.

Preventing the overwriting of the label may further include setting the virtual tape to read-only. Preventing the overwriting of the label may further comprise sending an error message to the mainframe. The error message includes the reason the virtual tape volume prevented the write request.

The accidental loss protection system may operate transparent to the mainframe user or application software, or alternatively be further configured to allow the user to disable overwrite protection.

In one embodiment, a method comprises, in a hardware processor, receiving a write request to a virtual tape volume from a mainframe, detecting whether the write request overwrites a label of the virtual tape volume with user data and preventing the overwriting of the label.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments follows.

A product such as the Data Library for Mainframe (DLm) available from EMC, Inc. of Hopkinton, Mass. is a virtual tape library for an IBM or compatible mainframe.

Figure 1:
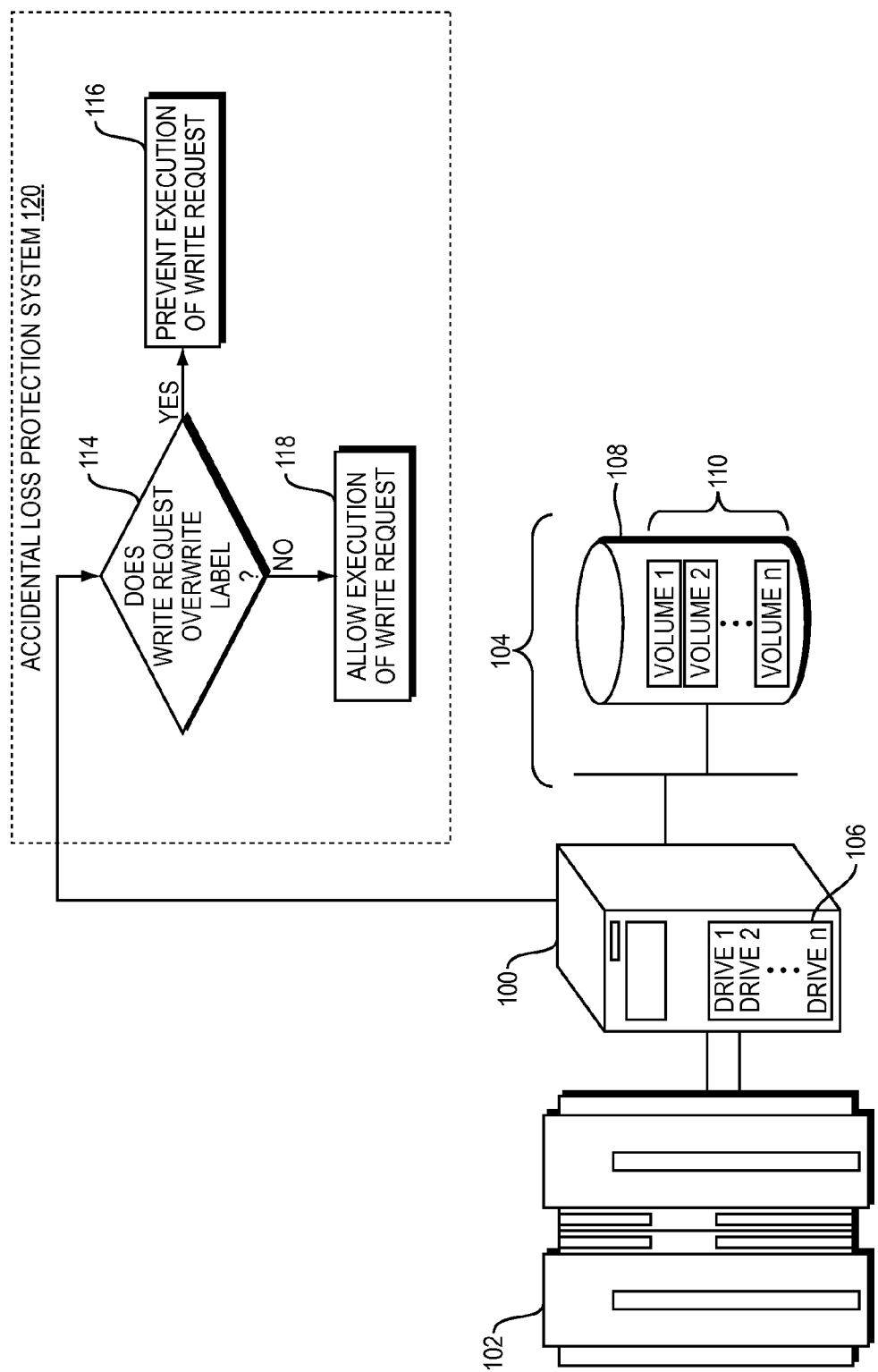
FIG. 1 is a block diagram of a system employed to operate a data library for mainframe that is configured to receive a write requests with accidental loss protection enabled.
Figure 2:
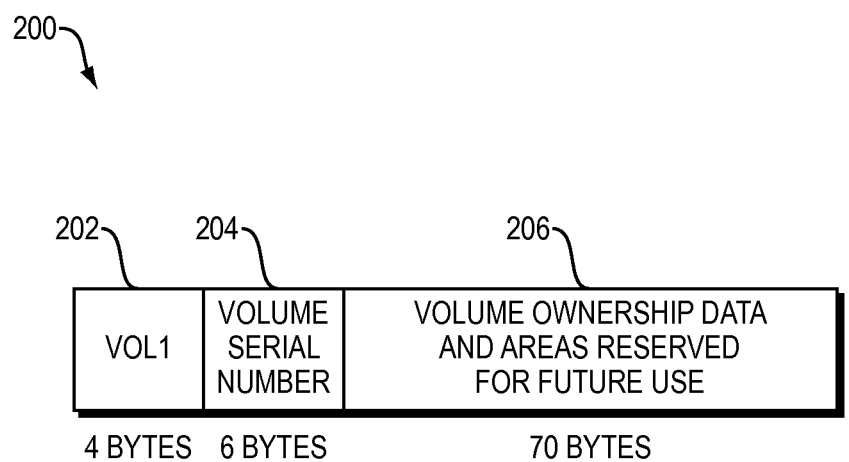
FIG. 2 is a diagram of an embodiment of a volume label of a tape volume image.

FIG. 1 is a block diagram of a system employed to operate the DLm that is configured to receive a write request 112 with accidental loss protection enabled. The DLm is an input/output controller 100 coupled with a mainframe 102 and disk based storage subsystem 104 that can, for example, be a standard open-systems disk storage subsystem. The DLM emulates a given number of virtual tape volumes 106 to the mainframe 102. The backend system 104 stores the data as one of a plurality of tape volume images 110 when a mainframe-based application writes data to any of the virtual tape volumes 106 emulated by the DLM. Each individual tape volume image 110 written by the mainframe 102, can, for example, be a single disk file on the filesystem 108 of the disk-based storage subsystem 104. Each tape volume image 110 can include a volume label, as illustrated in FIG. 2, described below.

Returning to FIG. 1, if the mainframe 102 overwrites or corrupts the volume label of a particular tape volume image 110 some or all of the data stored on the particular tape volume image 110 becomes unreadable or irretrievable. Therefore, protecting the volume label from accidental overwrites is desirable.

Distinguishing between accidental overwrites of a volume label and intentional overwrites of a volume label is also desirable to protect each tape volume image 110 without limiting a user or software application from having full access to the virtual tape volume. An accidental overwrite is a write request that 1) is directed to a tape volume image 110 that has already received data writes, 2) jumps or rewinds to the beginning of the tape volume image 110, 3) is directed towards a tape volume image 110 that includes a volume label or 4) is attempting to overwrite the volume label with data, not another label. Any combination of these factors may indicate an accidental overwrite. In one embodiment, all four factors indicate an accidental overwrite. An accidental loss protection system 120 which can be, for example, a subsystem of the input/output controller 100, can test these factors to differentiate between accidental and intentional volume label overwrites without requiring changes to the application, software, user behavior or mainframe 102. The accidental loss protection system 120 does not change the behavior of a user, the mainframe, mainframe software, mainframe applications. Rather, the accidental loss protection system 120 checks write requests 112 from an unmodified user, mainframe, mainframe software, or mainframe application for an errant command that overwrites a label.

Upon receiving the write request 112, accidental loss protection system 120 checks whether the write request 112 targets and overwrites a volume label on the tape volume image 110 such that data on the tape volume image 110 is not recoverable (Step 114). If the write request 112 attempts to overwrite a volume label such that data on the tape volume image 110 is not recoverable, the accidental loss protection system 120 prevents execution of the write request 112 by setting the tape volume image 110 to read-only mode (Step 116). If the write request 112 does not overwrite a volume label such that data on the tape volume image 110 is not recoverable, the accidental loss protection system 120 allows execution of the write request 112 from the input/output controller 100 (Step 118).

FIG. 2 is a diagram of an embodiment of a volume label 200 of a tape volume image 110. The volume label 200 includes a constant value 202, a volume serial number ("VOLSER") 204 and other volume label data 206. The constant value 202, in one embodiment, is 4-bytes and always has the value "VOL1." The accidental loss protection system 200 searches for the constant value 202 in determining whether the tape volume image 110 has a label or not. The VOLSER 204 is a serial number that uniquely identifies the tape volume image 110. The VOLSER 204 can include any alpha-numeric character in addition to a dash ('-'). The VOLSER can be up to 6-bytes in length, however, if it is shorter than 6-bytes, the rightmost characters in the VOLSER are blank, such that it always occupies a full 6-bytes. The other volume label data 206 defines volume ownership and includes areas reserved for future use. A person of ordinary skill in the art can appreciate different volume labels can be employed.

Figure 3:
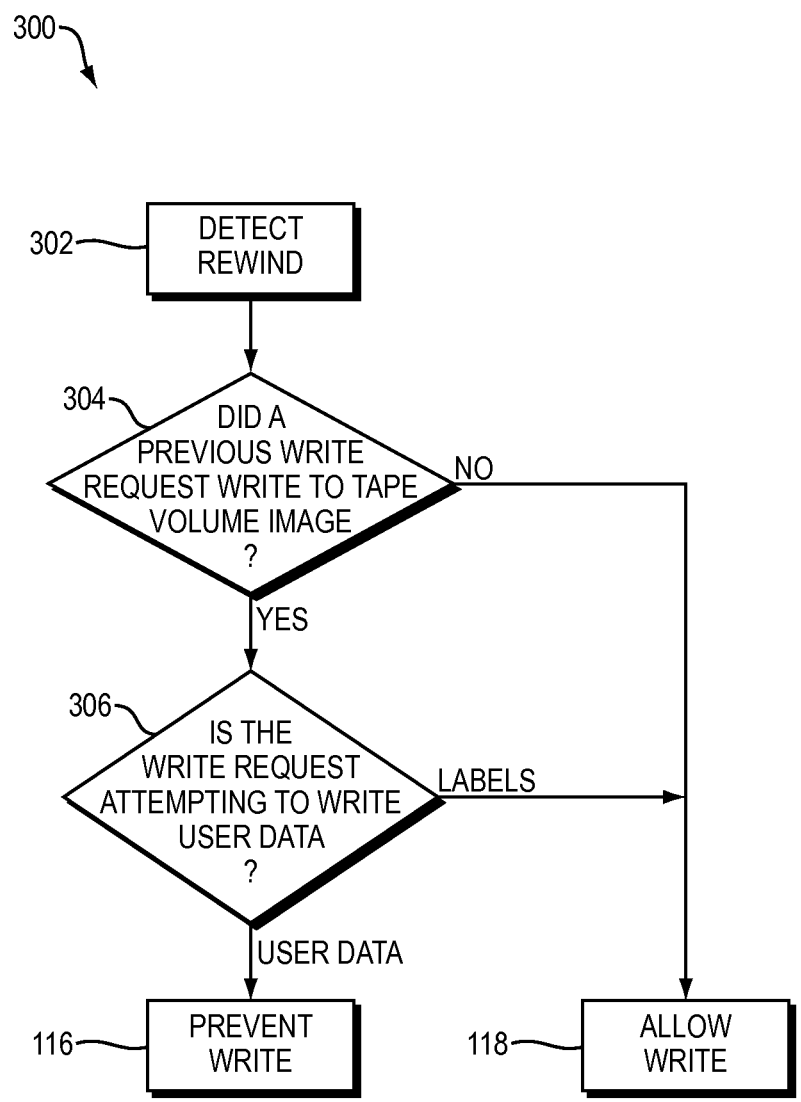
FIG. 3 is a flow diagram of an embodiment of a method employed by the accidental loss protection system.

FIG. 3 is a flow diagram 300 of an embodiment of a high level method implemented by the accidental loss protection system 120. The accidental loss protection system 120 detects a rewind by determining whether the write request 112 rewinds or jumps to the beginning of a tape volume image 110 (Step 302). The accidental protection system 120 determines whether the write request 112 rewinds or jumps to the beginning of a tape volume image 110 by determining whether the write request is directed at the beginning of a tape volume image. The accidental loss protection system 120 tracks the positioning of the tape volume image 110 at all times using a block offset. In one embodiment, 'Block 0' is the first block on the tape, 'Block 1' is the second block on the tape, etc. If the accidental loss protection system 120 detects a rewind or jump, it determines whether previous write requests have written data to the tape volume image 110. The accidental loss protection system 120 stores a count of writes directed to each tape volume image 110 that is reset each time the tape volume image 110 is mounted. In one embodiment, the count of writes is stored in a memory. A separate count of writes exists for each tape volume image 110. The accidental loss protection system 120 determines whether previous write requests have written data to the tape volume image 110 by determining by checking the count of writes directed to each tape volume image 110. If no previous write request has written data to the tape volume image 110, the accidental loss protection system 120 allows execution of the write request 112 because, in this scenario, it is likely the write request 112 directed to the beginning of the volume is not accidental (Step 118).

If previous write requests wrote data to the tape volume image 110, however, writing to the beginning of the volume overwrites the volume label and corrupts all data on the tape volume image 110. In this scenario, the accidental loss protection system 120 determines whether the write request 112 is attempting to write data or a label (Step 306). If the write request 112 is attempting to write a label, then the accidental loss protection system allows execution of the write request 112 (Step 118). If the write request 112 is attempting to write user data, however, the accidental loss protection system prevents execution of the write request 112 (Step 116).

Figure 4:
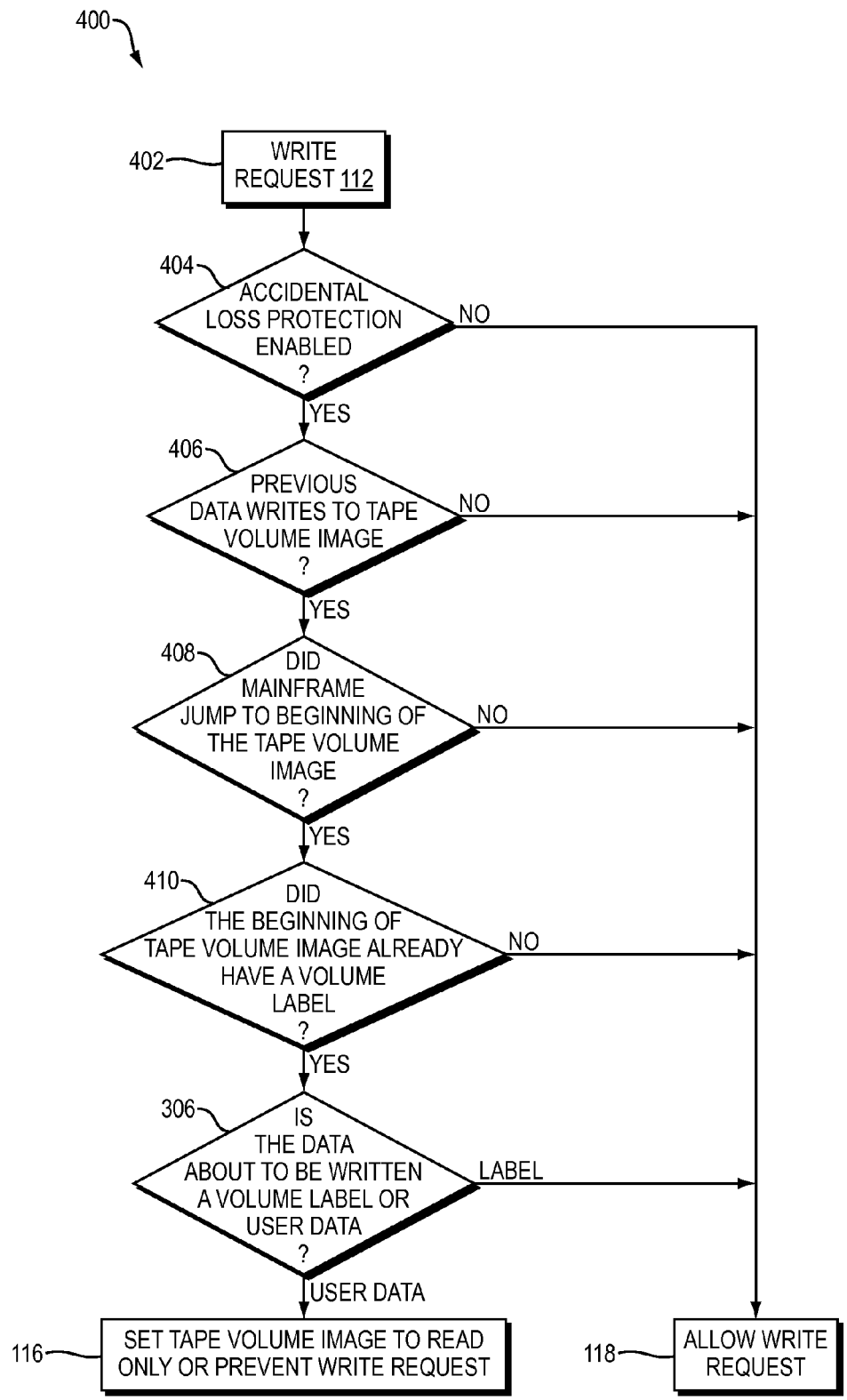
FIG. 4 is flow diagram of an embodiment of a method employed by the accidental loss protection system.

FIG. 4 is a flow diagram 400 of an embodiment of a more detailed method employed by the accidental loss protection system 120. The accidental loss protection system 120 first receives the write request 112 (Step 402). Then, the accidental loss protection system 120 determines whether the accidental loss protection system 120 is enabled (Step 404). The accidental loss protection system 120 is enabled system wide either by configuration or operator command. An authorized user of the accidental loss protection system 120 can be delegated to enable or disable the accidental loss protection system 120. A person of ordinary skill in the art can appreciate that any of a memory, processor, or file can store the configuration or operator command enabling or disabling the accidental loss protection system 120. If accidental loss protection is not enabled, the accidental loss protection system allows execution of the write request 112 (Step 118).

If the accidental loss protection system 120 is enabled, it determines whether data has previously been written to the volume before the current write request 112 (Step 406). If no data has previously been written, as described above, the write request 112 at the beginning of the drive is unlikely to be accidental. Therefore, without previous data writes to the tape volume image 110, then the accidental loss protection system 120 allows execution of the write request 112 (Step 118).

If there have previously been data writes to the tape volume image 110, then the accidental loss protection system 120 determines whether the write request 112 either rewinds or jumps to the beginning of the virtual tape volume by determining whether the write request 112 is directed at the beginning of the tape volume image 110. (Step 408). If the write request 112 does not rewind or jump to the beginning of the virtual tape volume, the accidental loss protection system 120 allows execution of the write request 112 (Step 118).

If the write request 112 does rewind or jump to the beginning of the virtual tape volume, the accidental loss protection system 120 determines whether the tape volume image 110 has a volume label at its beginning by 120 determining whether the first block of the tape includes a volume label. If the tape volume image 110 does not have a volume label, an accidental label overwrite of a volume label cannot occur and therefore the write request 112 can write data to any location on the tape volume image 110. Therefore, if the volume has no label, the accidental loss protection system 120 allows execution of the write request 112 (Step 118).

If the tape volume image 110 does have a volume label, however, the accidental loss protection system 120 determines, as described above in reference to FIG. 3, whether the data in the write request 112 is a label or data (Step 306). The accidental loss protection system 120 determines whether the data in the write request 112 is a label or data by inspecting the write request 112. If the write request 112 contains a label, then the accidental loss protection system 120 allows execution of the write request 112 (Step 118) because writing a label to the beginning of a tape volume image 110 is not likely to be an accidental write. If the write request 112 contains data, then the write request 112 is likely an accidental write because the accidental protection system has determined that i) there have been previous data writes to the volume, ii) the virtual tape already has a label, iii) the write request 112 rewound or jumped to the beginning of the tape, and iv) the write request 112 is data and not a label. Therefore, in this scenario, the accidental loss protection system 120 prevents execution of the write request 112 by setting the virtual tape to read only mode (Step 116).

Figure 5:
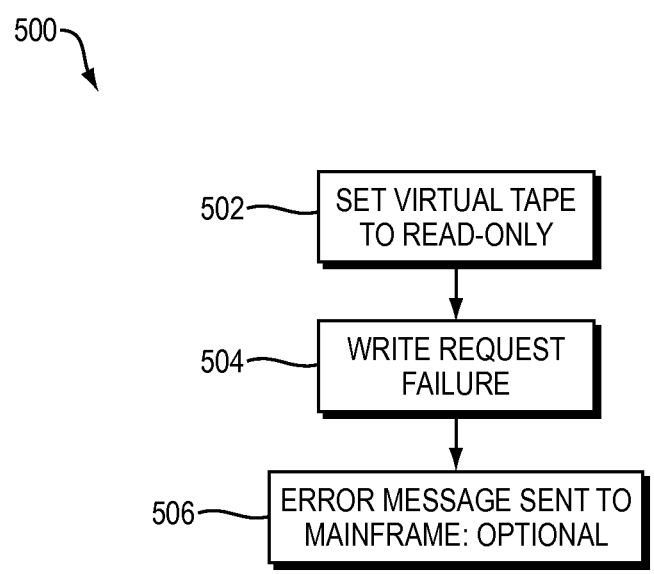
FIG. 5 is a flow diagram of a method employed by the accidental loss protection system to block a write request.

FIG. 5 is a flow diagram 500 of a method employed by the accidental loss protection system 120 to prevent execution of the write request 112 that does not modify the mainframe application. The accidental loss protection system first sets the tape volume image 110 to read-only mode (Step 502), causing a write request failure (Step 504). Setting the tape volume image 110 to read-only causes a write request failure because the mainframe attempts to execute the write request 112 by forwarding the write request to the tape volume image 110, however, the tape volume image 110 issues an error message because it cannot write any write request while in read-only mode. The error message can be a standard generic error return status, such as a "unit check." The mainframe receives the error message generated by the tape volume image 110 (Step 506). The mainframe can issue a "sense command" upon receiving the unit check to the tape volume image 110 to obtain more detail regarding the error. The tape volume image then returns that the error is a write protection error. The mainframe handles the error according to its own programming.

A person of ordinary skill in the art will appreciate that embodiments or aspects of the method and system described above may be implemented in the form of hardware, software, or firmware. If implemented in software, the software may be any form of software capable of performing operations consistent with the example embodiments disclosed herein. The software may be stored in any non-transient computer readable medium, such as RAM, ROM, magnetic disk, or optical disk. When loaded and executed by processor(s), the processor(s) are configured to perform operations consistent with the example embodiments disclosed herein. The processor(s) may be any form of processor(s) capable of being configured to execute operations as disclosed herein.

While this invention has been particularly shown and described with references to example embodiments thereof, it will be understood by those skilled in the art that various changes in form and details may be made therein without departing from the scope of the invention encompassed by the appended claims.

What is claimed is:

1. A system comprising:
    a virtual tape volume, coupled to receive a write request from a main data system; and
    an accidental loss protection system configured to
        detect whether the write request overwrites a label of the virtual tape volume based on at least one previous write request and the write request by determining whether
            (i) at least one previous write request wrote user data to the virtual tape volume,
            (ii) the write request jumped or rewound to the beginning of the virtual tape volume,
            (iii) the virtual tape volume has a label, and
            (iv) determining whether content of the write request is user data and not a label;
        if the determinations of all of (i), (ii), (iii), and (iv) are positive, then preventing the overwriting of the label; and
        if the determinations of at least one of (i), (ii), and (iii), (iv) are negative, then executing the write request.

2. The system of claim 1, wherein preventing the overwriting of the label further comprises setting the virtual tape to read-only.

3. The system of claim 2, wherein preventing the overwriting of the label further comprises sending an error message to the mainframe.

4. The system of claim 3, wherein the error message includes the reason the virtual tape volume prevented the write request.

5. The system of claim 1, wherein the accidental loss protection system is further configured to operate transparent to a mainframe user or application software.

6. The system of claim 1, wherein the accidental loss protection system is further configured to allow disabling of overwrite protection.

7. A method comprising:
    in a hardware processor:
        detecting whether a write request received at a virtual tape volume overwrites a label of the virtual tape volume based on at least one previous write request and the write request by determining whether
            (i) at least one previous write request wrote user data to the virtual tape volume,
            (ii) the write request jumped or rewound to the beginning of the virtual tape volume,
            (iii) the virtual tape volume has a label, and
            (iv) determining whether content of the write request is user data and not a label;
        if the determinations of all of (i), (ii), (iii), and (iv) are positive, then
            preventing the overwriting of the label; and
        if the determinations of at least one of (i), (ii), and (iii), (iv) are negative, then executing the write request.

8. The method of claim 7, wherein preventing the overwriting of the label further comprises setting the virtual tape to read-only.

9. The method of claim 8, wherein preventing the overwriting of the label further comprises sending an error message to the mainframe.

10. The method of claim 9, wherein the error message includes the reason the virtual tape volume prevented the write request.

11. The method of claim 7, further comprising operating transparent to a mainframe user or application software.

12. The method of claim 7, further comprising enabling or disabling of overwrite protection according to a configuration or an operator command.

* * * * *